Figure 1:
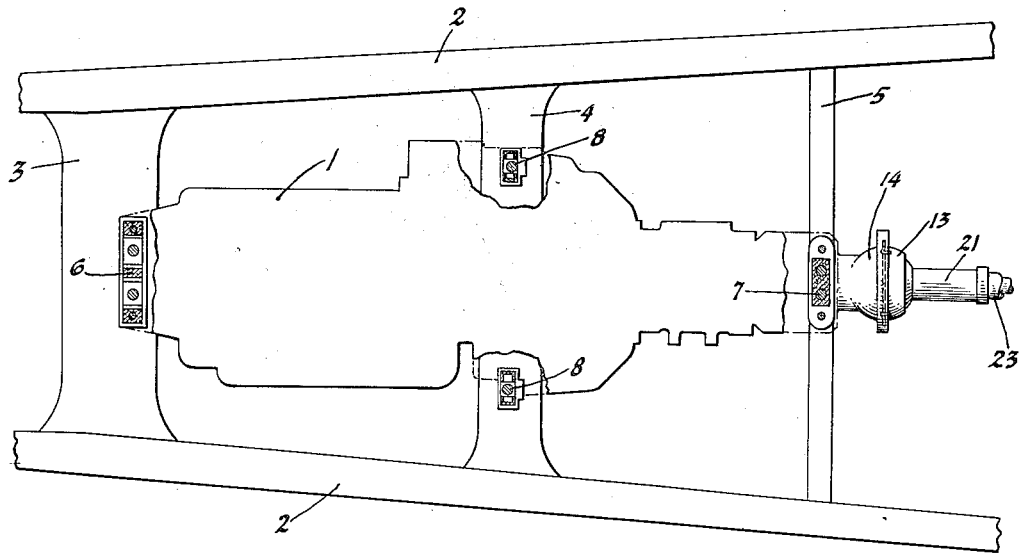

March 13, 1934.   A. TAUB   1,950,637
ENGINE MOUNTING
Filed June 24, 1932

Inventor
Alex Taub
By Blackmore, Spencer & Flint
Attorneys

Patented Mar. 13, 1934

1,950,637

UNITED STATES PATENT OFFICE 1,950,637

ENGINE MOUNTING

Alex Taub, Detroit, Mich., assignor to General Motors Corporation, Detroit, Mich., a corporation of Delaware Application June 24, 1932, Serial No. 619,023

6 Claims. (Cl. 180—64)

Among the many refinements that have been made throughout the past few years in motor vehicle design to improve riding comfort and add to motoring enjoyment, are those which have resulted in relieving the mind and senses of the motor vehicle passenger of some of the objectionable effects of engine operation. Smoother and quieter running engines have been developed, and various types of damping and cushioning devices applied to make less noticeable the inherent noises and reactionary forces. Flexible connections of almost every conceivable form have been employed for insulating the engine from the chassis frame, and these have been partly successful in preventing the transference to the frame and the amplification therein of engine vibration. Engine vibration has also been reduced by careful design and improved production methods, including the maintenance of closer limits, the balancing of parts, the selection of proper weights and so on. It is practically impossible to eliminate all vibrations and forced movements, since they result not only from mechanical causes, such as lack of balance, movements of both reciprocatory and rotary parts, but also from the reactions from compression and explosion forces, as well as sudden changes in operating conditions and in the case of a multiple cylinder engine from the variations in the power output of different cylinders. As regards the engines in any of the well known automobiles of today it is a fact that the vibration is not particularly objectionable so long as the engine is run at a constant speed for a given average load. Under such given conditions, experience indicates that the use of flexible engine mountings will ordinarily permit the engine to vibrate independently of the frame, which is to say, there will be no perceptible transference of vibrations to the frame. Roughness in operation is most pronounced when the load is suddenly increased, as for example, upon sudden acceleration from slow speed and until engine speed and load become readjusted. In this rough period, flexible mountings are insufficient to completely insulate the engine from the frame, and vibrations are transferred through the mountings to the frame, fenders and body, setting up sympathetic movements of other parts and being most disagreeable to occupants of the motor vehicle.

With these things in mind, I have devised a system for mounting an engine in a fashion to effectually damp vibrations and relieve the frame from the imposition thereon of forced movements. A specific embodiment of my proposal involves among other things, the mounting of the engine by means of rubber cushioning devices, which eliminates metal to metal contact and while serving to hold the engine fairly steady, allows sufficient relative movement for the engine to vibrate within a small range, so that the frame is freed from minor vibratory movements. To cushion or damp large amplitude vibrations due to load changes, or other reason, I have provided an arrangement to check or absorb the forces and prevent a vibratory period being built up. This arrangement, according to a preferred form, involves the interposition between the engine and rear axle third member of a yielding resistance joint which snubs the impulses, and any forces transmitted are dissipated through the axle assembly and partly through the pneumatic tires on the vehicle wheels. The snubber element itself exerts no reactionary forces, which is to say, it offers no elastic resistance, but affords merely a frictional drag and tends to cushion movements in both directions and thereby effectually choke off the wave train. It will be obvious that with a construction of this sort the chassis frame and parts associated with it are substantially freed from the effects of engine vibration.

Figure 2:
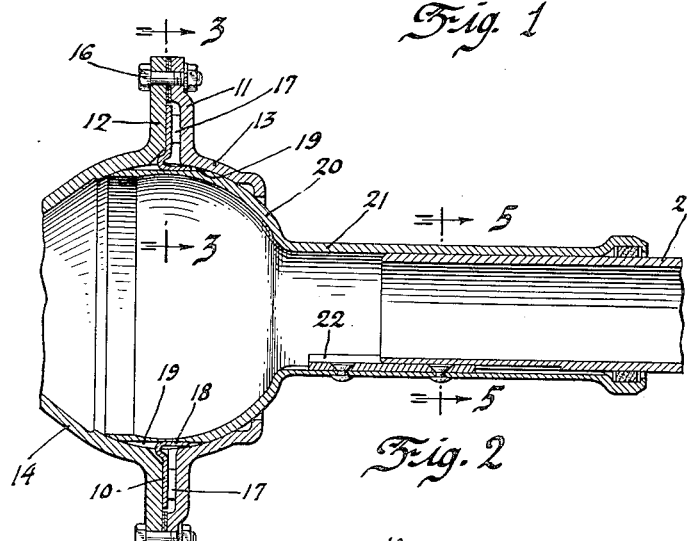
Figure 4:
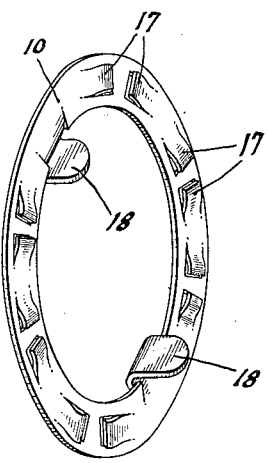
Figures 3, 5:
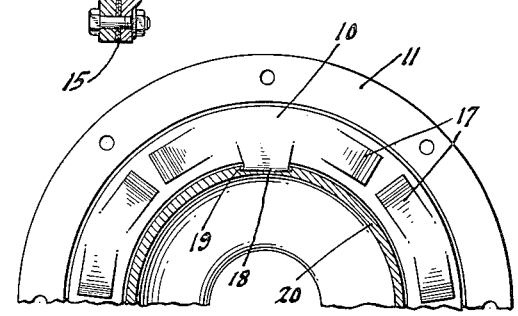

A better understanding of the invention will be had upon reference to the accompanying drawing, wherein Figure 1 is a top plan view showing an engine mounted in a chassis frame with parts broken away and shown in section. Figure 2 is a longitudinal sectional view of the ball and socket joint between the engine and rear axle third member. Figure 3 is a fragmentary elevational view looking in the direction of the arrows on line 3—3 of Figure 2. Figure 4 is a detail perspective view of a friction ring intended for association with the ball and socket elements, and Figure 5 is a transverse section taken on line 5—5 of Figure 2.

Referring to the drawing, the power plant or engine unit, indicated by the numeral 1, is shown in outline form and it may comprise, as in the case of motor vehicles of today, the engine proper, the clutch, change speed gearing, and a free wheeling unit. This power plant may be mounted through suitable rubber or other non-metal connections on the vehicle chassis frame, shown in the drawing as comprising a pair of longitudinal side members 2—2, and a series of transverse frame members, three of which are indicated by the numerals 3, 4 and 5.

In the arrangement illustrated use is made of four flexible connections between the engine and frame, including a resilient attachment 6 at the front end of the engine with the frame member 3, a connection 7 at the rear with the transverse member 5 and a pair of laterally spaced intermediate supports 8—8 for fastening opposite sides of the engine, preferably at the flywheel housing, with the cross member 4. In one embodiment, the construction is such that the entire weight of the engine unit is taken normally by the two framing members 3 and 4 with the rear connection 7 serving primarily as a hold-down or stabilizer whose function among other things is to yieldably anchor the engine to the frame so that those parts overhanging the supports 8—8 will be freed from bending strains and thrusts which are unusually severe where torque tube drive is employed.

The character and form of flexible engine mounting is incidental to the present invention and can be varied to meet conditions of use. Regardless of their number and relative location, it is desirable that the mounting be such as to hold the engine against fore and aft movement due to inertia forces upon quick starts and stops of the vehicle, and to allow limited movement in certain other paths dependent on the directions of vibratory forces. In most engines, the character of the vibrations differ at various speeds and loads.

Taking as typical the current model Chevrolet six cylinder engine, the vibrations at ordinary speeds and loads are of small range in both vertical and lateral directions but are hardly perceptible; in the higher speed range they become more pronounced laterally while at low or moderate speeds and heavy load, when the effect of torque reaction is greatest, they are most objectionable and result in a rocking or swinging movement about an inclined longitudinal axis lying considerably above the engine crankshaft axis at the front and intersecting or closely approaching the crankshaft axis at the rear of the power plant and adjacent the rearmost connection between the engine and chassis frame, such inclined axis itself undergoing a forced movement through an elliptical path whose major axis extends horizontally and which decreases in size toward its intersection with the crankshaft axis. With the exception of the last mentioned engine movements the frame can be freed from the effects of engine vibration by the use of properly designed flexible mountings.

To completely eliminate the transmission to the frame of all vibratory forces it is proposed to snub or check the movement by the use of a frictional damper located as closely as practical to the point of intersection of the polar axis and crankshaft axis, and where the vehicle is equipped with torque tube type drive, to dissipate the forces through the torque tube and associated running gear.

One form of damping structure which I have used with success may consist as illustrated in the drawing of a frictional ring 10 interposed between a pair of spaced flanges 11 and 12 carried by a retainer element 13 and a socket 14 respectively, the socket being rigidly secured to or formed as a part of the engine unit at the rear thereof. The flanges may be held apart by a series of spacer shims 15 and held together by a series of attachment bolts 16. To insure a frictional contact the ring may be provided with a series of substantially U-shaped slits arranged in pairs with the slits of each pair oppositely faced and the material defined by each U slit pressed out of the plane of the ring to afford a spring finger or blade 17, the free end of which extends toward the free end of the next adjoining spring blade. Thus there are two sets of spring devices projecting from the ring, and in opposite directions, whereby the same character of frictional contact is had in both directions of relative movement. On the inside of the ring 10 and in diametrically opposite relation are a pair of laterally bent tongues or lugs 18 which slidably engage and extend into longitudinal ways or grooves 19 in the peripheral surface of thee ball 20 seated in the socket 14 and held by the retainer for universal relative movement. A tubular extension 21 on the ball telescopically receives and has sliding splined engagement by means of a feather 22 with a torque tube or rear axle third member 23. No attempt has been made to show the complete rear axle assembly in the drawing because of its conventionality. It will be understood too, that the torque tube houses a propeller or drive shaft connected to a driving shaft by means of a universal joint enclosed within the hollow ball and socket joint, and that for the sake of clarity the driving universal joint and the propeller shaft are omitted in the drawing.

By the construction thus described it will be apparent that the relative movement between the axle and frame is accommodated in the usual fashion by the ball and socket joint between the rear axle third member and the engine mounted in the frame. Upon relative angular movement the keys 18 simply slide in their respective grooves and upon axial movement the keys carry the ring 10 with the ball, the forces at such time being more than sufficient to overcome any frictional resistance between the ring 10 and flanges 11 and 12. This frictional resistance, however, is sufficient to damp or modify the extent of forced engine movement, and since the contacting surfaces merely slip or drag one over the other, no reactionary or rebounding forces are exerted but on the contrary the return movement also meets with resistance and the vibratory forces spend themselves in overcoming frictional resistance in both directions. Any forces transmitted through the torque tube are dissipated in the running gear and, therefore, the frame remains substantially unaffected and is saved from the imposition thereon of the forced movements inherent to the operation of the engine.

I claim:

1. In a motor vehicle, a flexibly mounted engine having at one end a concave socket provided with a lateral flange, a rear axle torque tube having a ball portion adapted to seat in said socket, a retainer cup securing the ball in the socket and having a lateral flange detachably connected with the first mentioned flange, and an element having a splined engagement with said ball and a frictional engagement with said flanges.

2. In a motor vehicle, a flexibly mounted engine having at one end a concave socket provided with a lateral flange, a rear axle torque tube having a ball portion adapted to seat in said socket, a retainer cup securing the ball in the socket and having a lateral flange detachably connected with the first mentioned flange, and a friction ring interposed between and in sliding contact with said flanges and in sliding keyed engagement with the ball for movement therewith upon relative movement of the ball and socket about a longitudinal axis only.

3. In a motor vehicle, a flexibly mounted engine having at one end a concave socket provided with a lateral flange, a rear axle torque tube having a ball portion adapted to seat in said socket, a retainer cup securing the ball in the socket and having a lateral flange detachably connected with the first mentioned flange, and a ring-like element splined on the ball for movement therewith about a longitudinal axis with a portion thereof extending between said flanges and having spring elements associated therewith to maintain a frictional contact between the ring and flanges.

4. In a motor vehicle, an engine, a floating mounting for the engine, an element forming a part of an axle assembly, a pivotal joint having its relatively movable parts associated respectively with the engine and said element, and means to damp vibration of the engine on its floating mounting, including non-reacting means interposed between said parts to frictionally resist their relative movement.

5. In a motor vehicle, an engine, a floating mounting for the engine, a rear axle member, a ball and socket joint connection between the engine and member, and engine vibration damping means, including a friction element operatively associated with the ball and socket to resist their relative movement about a longitudinal axis.

6. In a motor vehicle and in combination with the ball and socket joint connection between the engine and rear axle third member, of means interposed between the relatively movable ball and socket to yieldingly resist relative movement about a longitudinal axis only.

ALEX TAUB.